United States Patent
Kawada et al.

[11] Patent Number: 6,124,906
[45] Date of Patent: Sep. 26, 2000

[54] WEDGE SHAPED LIGHT GUIDE PROVIDING ENHANCED POLARIZED LIGHT TO A BACKLIGHT LIQUID CRYSTAL DISPLAY

[75] Inventors: Koji Kawada, Hadano; Yoji Oki; Masaru Suzuki, both of Yokohama; Yoshiteru Watanabe, Sagamihara, all of Japan

[73] Assignees: IBM Corporation, Armonk, N.Y.; Stanley Electric Co., Ltd., Tokyo, Japan

[21] Appl. No.: 09/151,846

[22] Filed: Sep. 11, 1998

[30] Foreign Application Priority Data

Sep. 12, 1997 [JP] Japan ............................. 9-249139
Mar. 5, 1998 [JP] Japan ............................. 10-053790

[51] Int. Cl.⁷ ................................................. G02F 1/1335
[52] U.S. Cl. .................................. 349/65; 362/31; 349/62
[58] Field of Search ................................. 349/65, 64, 62; 362/31; 385/129, 130

[56] References Cited

U.S. PATENT DOCUMENTS 4,914,553  4/1990  Hamada et al. ............................ 362/32
5,303,322  4/1994  Winston et al. ......................... 385/146
5,914,760  6/1999  Daiku ....................................... 349/65

FOREIGN PATENT DOCUMENTS

2-201316   8/1990  Japan .
4-271324   9/1992  Japan .
8-248224   9/1996  Japan .

Primary Examiner—James A. Dudek
Attorney, Agent, or Firm—Earl C. Hancock; Holland & Hart LLP

[57] ABSTRACT

The invention is intended to reduce the weight of the entire unit, make it compact and prevent the emitted light from being in dark and bright stripes in a light guide unit for a back light of a liquid crystal display device. Further, this invention allows a prism sheet having a larger apex angle to be used. To this end, the light guide unit comprises a plurality of light guide films laminated on the light guide member. The sloped surface which is opposite to the incident surface of the light guide unit is formed with grooves each having an inclination of an angle related to Brewster angle. A prism sheet is further disposed with the side having apexes oriented to the light guide unit to deflect the light emitted from the light guide unit.

24 Claims, 8 Drawing Sheets

STRUCTURE OF LIGHT GUIDE UNIT FOR POLARIZED LIGHT

FIG. 1

STRUCTURE OF LIGHT GUIDE UNIT FOR POLARIZED LIGHT

FIG. 2

P COMPONENT: 100% TRANSMITTED
S COMPONENT: 20% TRANSMITTED

S COMPONENT: 80% EMITTED
DIRECTION OF EMISSION AND POLARIZATION OF LIGHT FROM LIGHT GUIDE (WITHOUT REFLECTING PLATE IN THE BACK)

NEW DESIGN OF LIGHT GUIDE

DEFLECT 70% OF LIGHT TO THE FRONT BY A MATERIAL OF n=1.58

FIG. 8

DEFLECT 70% OF LIGHT TO THE FRONT BY A MATERIAL OF n=1.58

FIG. 9

CROSS SECTION OF 5 INCHES PROTOTYPE

FIG. 10

EMISSION FROM CFL UNIT

FIG. 11

WITHOUT λ/4 PLATE
EMISSION FROM POLARIZER LIGHT PIPE WITHOUT POLARIZER PLATE

FIG. 12

WITH λ/4 PLATE
EMISSION FROM POLARIZER LIGHT PIPE WITHOUT POLARIZER PLATE

FIG. 13

CROSS SECTION OF EMITTING DEFLECTION PLATE

FIG. 14

WITH λ/4 PLATE
EMISSION FROM POLARIZER LIGHT PIPE WITH POLARIZER PLATE

FIG. 15

UNIFORMITY MEASURING POINTS

FIG. 16

WEDGE SHAPED LIGHT GUIDE PROVIDING ENHANCED POLARIZED LIGHT TO A BACKLIGHT LIQUID CRYSTAL DISPLAY

BACKGROUND OF THE INVENTION

This invention relates to a light guide unit for use in a liquid crystal display device in which a polarized component of a light is enhanced.

1. Field of the Invention

A polarized light wave is a light in which a component of light is polarized. For obtaining such a polarized light wave, a non-polarized light was conventionally incident to a polarizer plate and either one of the polarized components, i.e., s component and p component, was absorbed. Therefore, more than 50-percent of an incident light was not effectively utilized in principle and an actual measurement shows that about 58-percent of the incident light is absorbed.

Further, a light dispersing sheet having printed dots was typically used in addition to a polarization device for obtaining a polarized light by absorbing a polarized component in a conventional Liquid Crystal Display (LCD) device, and this makes an additional 20-percent of light unavailable.

2. Description of the Related Art

Figure 1:
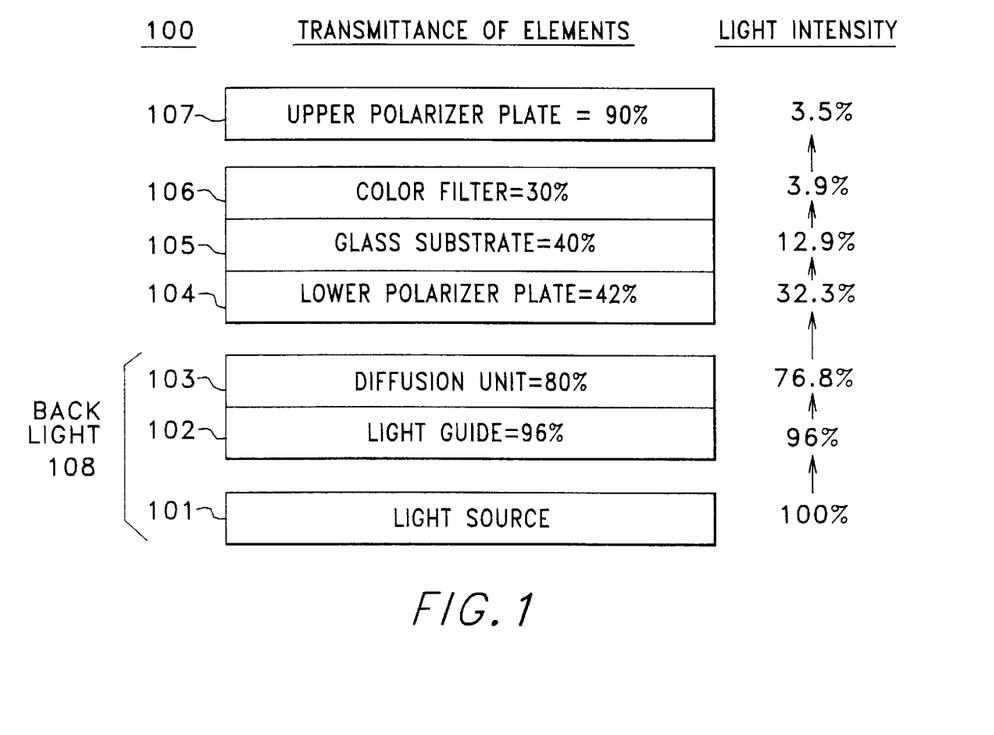
FIG. 1 is a schematic diagram showing a conventional LCD device.

In FIG. 1, a LCD module 100 of a conventional LCD device is shown. The light emanating from a light source 101 transmits through a light guide plate 102 having 96-percent transmittance, a dispersion sheet 103 having 80-percent transmittance, a lower polarizer plate 104 having 42-percent transmittance, a glass substrate 105 having a numerical aperture of 40-percent, a color filter 106 having 30-percent transmittance and an upper polarizer plate 107 having 90-percent transmittance, resulting in an actually available light intensity which is 3.5-percent of the light generated in the light source 101.

This greatly prevents the energy from being utilized efficiently. A back light system of a high intensity for use in a low power consumption LCD device is especially desired because it is an important objective in a portable personal computer to assure a longer usable time for a given capacity of a battery and the power consumption of a back light 108 is a major percentage of a total power consumption.

Also, the light energy absorbed in the lower polarizer plate 104, etc., is converted to a heat energy which contributes to degradation of parts of the LCD device. Particularly for a liquid crystal material of STN (Super Twisted Nematic) type in which the display quality is degraded by heat, it is an important objective to reduce such heat generation. As seen from FIG. 1, 66.4-percent of the light energy is converted to a heat energy by the light absorption in the lower polarizer plate 104 and the dispersion sheet 103 (this is 69-percent of heat generation by the light energy).

A technology of expediting an effective utilization of light is disclosed in PUPA 4-271324 in which a light guide comprises a lamination of a plurality of refracting layers of different refraction indices, and a light incident to an end surface is refracted in each interface between refracting layers so as to reach the light exit surface at an incident angle which is smaller than a critical angle for reducing the decrease of light flux and increasing the efficiency of light utilization.

Japanese patent PUPA 2-201316 uses a liquid crystal cell, a light guide plate disposed in the back of the cell, a colored filter disposed on the light guide plate, a polarizer plate having a reflecting plate provided in the back side of the light guide plate and a light source disposed in the edge surface of the light guide to reduce the number of transmittances through the polarizer plate to 1 thereby improving the efficiency of utilization of the light from the light source.

However, none of these prior art devices directs a light which contains a rich polarized component to the polarizer plate and they are not different from the prior art described above in that a polarized light is obtained by absorbing either one of the s and p components of the light. The art described above does not allow at least a portion of the polarization component which is absorbed and not so far utilized to be utilized. Incidentally, some conventional back lights include about 2.7-percent of light being polarized, but this is not intended to polarize the light from the light source in the back light.

As a technology of obtaining a polarized component by reflection/transmission characteristics without using a polarizer plate, a Polarized Beam Splitter (PBS) and a transmission type linear polarizer exist, but they are only capable of utilizing one of the s and p components of the light or utilizing both separately without a capability of effectively utilizing both s and p components. Further, because a conventional transmission type linear polarizer causes light to be incident directly in Brewster angle, it is unable to emit a condensed light dispersed over a wide exit surface. In addition, a sophisticated work is required for making it into a thin structure. For these reasons, the technology of obtaining a polarized light without using a polarizer plate could not be utilized as a light guide unit for an LCD device.

In order to solve such problems, Japanese patent application 7-40633 was filed by the applicant of the present application relating to a method of improving the efficiency of light utilization in obtaining a polarized light by making at least a portion of a polarized component which was not utilized in the prior art usable for obtaining a polarized light. This application is based on the fact that an s polarized component has reflection/transmission characteristics different from p polarized component so that the reflected light and transmitted light have differing ratios of s and p polarized components, the reflected light having s component of x1-percent and p component of y1-percent. while the transmitted light has an s component of x2-percent and a p component of y2-percent (x1'"x2, y1'"y2). The ratio of s and p components of either the reflected or transmitted light is changed by means of changing the polarization of the light, and the propagation direction of the light is changed by means of changing the propagation direction of light to a direction in which both the reflected and the transmitted lights can be utilized so that a light having a ratio of s and p components which is different from the incident light (s; x0-percent p; y0-percent) is available in the propagation direction of the reflected light.

Figure 2:
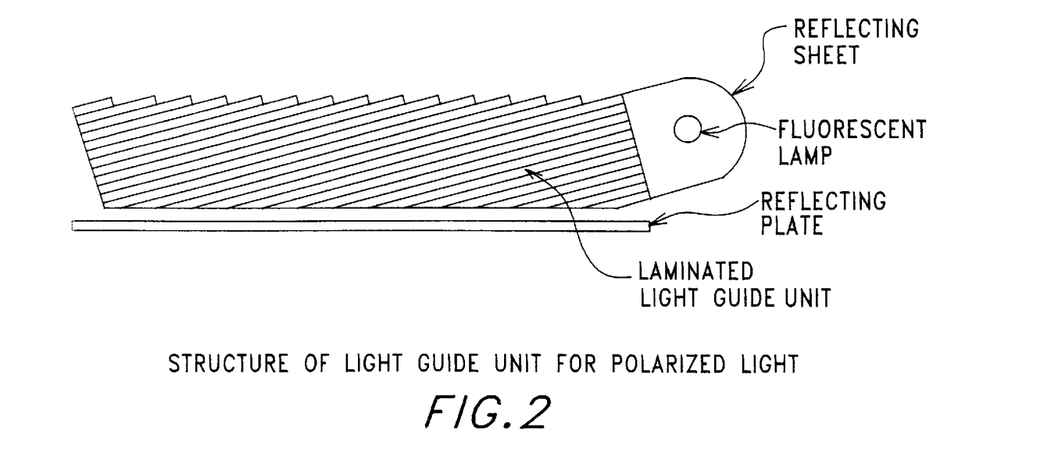
FIG. 2 is a diagram showing the structure of a conventional LCD polarizer plate unit.

However, it is found that the invention of the above co-pending application involves two problems. The first problem is that dark and bright stripes are generated by re-absorption of a portion of the exiting light by the light guide resulting in a reduced intensity of p component. As shown in FIG. 2, a structure of laminated acrylic plates is employed as a light guide for utilizing polarized component which was not utilized conventionally.

Figure 3:
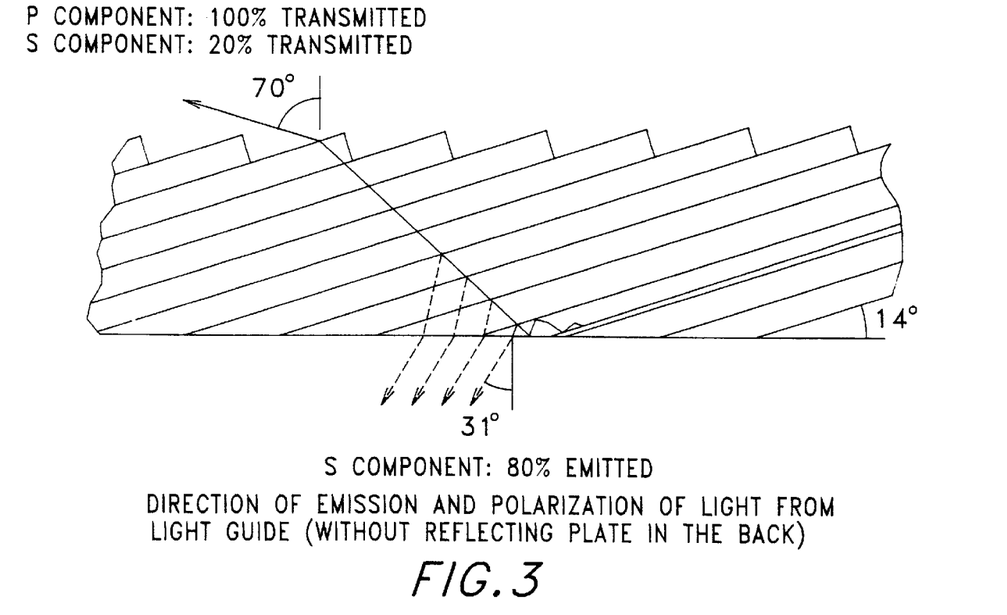
FIG. 3 is a diagram showing the structure of a conventional LCD polarizer plate unit.

FIG. 3 shows a case where the acrylic plate makes an angle of 14-degrees with respect to a reflecting plate and a light is emitted from the upper surface at an angle of 70-degrees after total internal reflection at the bottom plate. While the light does not re-enter the light guide if the light emits out, as shown in FIG. 3, the light may re-enter the light guide right after exiting the light guide at the edge of neighboring acrylic plate depending on the positional relationship of emission. The re-entering light proceeds to the bottom surface and will never be emitted out.

Therefore, there are places where the light is totally emitted out and places where the light is re-absorbed depending on places, resulting in dark and bright stripes when observed as a liquid crystal display device. Naturally, the overall brightness is low due to the loss of the light.

The second problem is that the entire device is thick and heavy. In consideration of the refraction index of the acrylic sheet being 1.49 and that of air being 1.00, an angle coinciding the Brewster angle after total reflection at the bottom surface is limited to the case where the angle of the slope of the light guide is 28/m, where m is the number of total reflections of the light at the bottom surface until the light is emitted outwardly.

FIG. 3 shows the case of m=2 where the light is once reflected at the bottom surface and then reflected at the interface with the neighboring acrylic plate followed by a further total reflection at the bottom surface. The angle of slope will be 14-degrees in this case, and this would result in more than 30 mm thickness of the entire light guide plate when a model of 12-inches class is manufactured. This is a considerable disadvantage when taking into consideration the fact that the main stream of conventional applications in which the liquid crystal surface is illuminated by a non-polarized dispersed light is about 3 mm.

Further, the weight is heavy because the entire square cross section is filled with acrylic material as shown in FIG. 2. The light guide has to be made thinner and lighter for use in a liquid crystal display device. A conventional type of light guide using non-polarized dispersed light may be often formed into the shape of a wedge to dispose a circuit plate in the open space at the apex thereof for effective utilization of the space. Whereas, those shown in FIG. 2 and FIG. 3 which use polarized component not so far utilized have a problem in that they are of entire cross section of rectangular shape without having a tapered end in the side opposite to the side connected to the fluorescent lamp so that they are not compatible with a conventionally used wedge type light guide.

In addition to the above-described problems, the prior art technology has a problem as described below. Because the light is emitted out in an inclined direction from the light guide, it is necessary to change the direction of the inclined emitted light vertically with respect to the screen so that the brightness as seen from the front of the liquid crystal imaging device is maximized. Reduction of the weight of a liquid crystal imaging device requires that a light guide sheet makes a small angle with respect to a reflecting plate unit and this would result in a larger inclination of the angle of the direction of the emitted light. Conventionally, a prism was disposed with its apex directed to the direction opposite to the light guide, but a larger angle of inclination requires a sharper apex which is more difficult to manufacture.

SUMMARY OF THE INVENTION

It is an object of this invention to prevent the emitted light from being re-absorbed to avoid a dark and bright stripe from being generated in a liquid crystal display device which utilizes a polarized component not so far utilized to improve the efficiency of light.

It is another object of this invention to maintain a compatibility with a conventional liquid crystal display device by allowing a light guide unit to be of a wedge shape.

It is another object of this invention to make the thickness of a light guide as thin as possible to reduce the weight of the entire device and make it compact. It is also an object of this invention to prevent the emitted light from being patterned in dark and bright stripes.

It is a further object of this invention to allow the deflection of the emitted light to be changed without making the apex of a prism as sharp as used to be in the prior art.

This invention provides a light guide unit comprising a light guide member having an incident surface in one end surface and having the other end surface inclined with respect to the direction of thickness, a reflecting plate disposed adjacent to said other end surface, means disposed between said member and said reflecting plate for changing the direction of polarization of the light, and a plurality of light guiding layers laminated on the surface of a larger area of said light guide member.

The light guide unit of this invention is further characterized in that said light guide member comprises a plurality of laminated light guiding sheets, and said plurality of light guiding layers are thinner than each sheet of said plurality of laminated light guiding sheets.

The light guide unit of this invention is further characterized in that said light guide member comprises a single light guiding sheet, and each light guiding layer of said plurality of light guiding layers is thinner than said single light guiding sheet.

The light guide unit of this invention is further characterized in that each of said plurality of light guiding layers is of a substantially same shape.

The light guide unit of this invention is further characterized in that the area of the larger area surface of said light guide member is substantially the same as the area of each layer of said plurality of light guiding layers.

This invention further provides a light guide unit comprising a light guide member having an incident surface in one end surface and having the other end surface inclined with respect to the direction of thickness, a reflecting plate disposed at said other end surface, and means disposed between said member and said reflecting plate for changing the direction of polarization of the light, said other end being cut into a surface which has a plurality of grooves disposed in the direction perpendicular to the direction of the thickness of the light guide member.

The light guide unit of this invention is further characterized in that said groove comprises a combination of a slope of an angle of inclination less than the angle of inclination of the other end surface and another slope of a larger angle of inclination, and said larger angle of inclination has an angle of inclination related to the Brewster angle.

The light guide unit of this invention is further characterized in that said groove comprises a combination of a slope of an angle of inclination less than the angle of inclination of the other end surface and another slope of a larger angle of inclination, and said larger angle of inclination fO is given by;

$$fO = \cos^{-1}\{(n2/n1)[n12/(n12+n22)]^{1/2}\}/2$$

where n1 is an index of refraction of the light guide and n2 is an index of refraction of a material other than the light guide.

This invention further provides a light guide unit comprising a light guide member having an incident surface in one end surface and having the other end surface inclined with respect to the direction of thickness, a reflecting plate disposed at said other end surface, means disposed between said member and said reflecting plate for changing the direction of polarization of the light, and a prism sheet having apexes only in one side and disposed in the side of the larger area surface of said light guide member, the side of said prism sheet having the apexes formed therein being confronted said light guide member.

The light guide unit of this invention is further characterized in that the shape of the apex of said prism is symmetrical, and the angle of said apex satisfies the following expression;

$$\sin^{-1}[(n0/n1)\sin(A+fi-fI/2)]-3fi+fI/2=0$$

where fi is an angle of the apex/2 (rad),
n0 is an index of refraction of a material surrounding the prism,
n1 is an index of refraction of the prism, and
A is an angle (rad) which the light incident to the prism makes relative to the normal line from the surface opposite to the surface having the apexes of the prism.

This invention further provides a liquid crystal display device provided with a back light unit including said light guide member in the back of the liquid crystal display cell.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

The device for enhancing a polarized component comprises means for changing the direction of polarization of either one of lights reflected by, or transmitted through, an interface between two materials having differing indices of refraction, the light directed to the interface including a first polarized component, and a second polarized component, and means for changing the direction of propagation of either the light the direction of polarization of which is changed, or the light other than the light the direction of polarization of which is changed into a direction which allows these two lights to be utilized simultaneously.

The means for changing the direction of polarization of the light includes a phaser for changing the phase, such as a quarter wavelength plate and a half wavelength plate, etc., and a polarimetric element for rotating the polarization plane such as a Faraday element, etc. The means for changing the direction of propagation of the light includes a reflecting plate and a prism sheet, etc. Means for changing the direction of polarization and simultaneously changing the direction of propagation of the light includes a Fresnel rhomb, etc. The use of all these means are included in the concept of this invention.

Further, the interface between materials of differing indices of refraction may include an existing polarizer, such as a polarized beam splitter and a transmitting linear polarizer, etc. Accordingly, this invention may be implemented by an existing polarizer, means for changing the direction of polarization and means for changing the direction of propagation of the light, or only by an existing polarizer and a Fresnel rhomb.

The light guide unit comprises a light guide member one end surface of which is the light incident surface, a plurality of light guiding layers laminated thereon, a reflecting plate disposed in the other end of said light guide member, and means disposed between said light guide member and said reflecting plate for changing the direction of polarization of the light. The other end surface of the light guide member is inclined with respect to the direction of the thickness. The plurality of light guiding layers are laminated on the surface of the larger area of the light guide member.

The light guide member and the plurality of light guiding layers are preferably of a material which assumes a low internal absorption of the light, such as an acrylic sheet and preferably transparent materials including acryl, PMMA (polymethylmethacrylate), polycarbonate, polyethylene, Se, and AgCl. The shape of the light guide member may be in a shape suitable for use, such as a bar and a curved surface without being limited to a plate and a sheet. The light guide member may be of a single piece or a lamination of a plurality of sheets.

These light guides are not limited to a same size, or a same material and a member requiring a stiffness may be designed thick while a member which does not require a stiffness may be designed thin. Also, materials of differing indices of refraction may be deposited in multiple layers on a stiff light guide to increase the number of laminated layers while maintaining a stiffness. In using an acrylic sheet in the light guide member, the thickness of the sheet is preferably 0.1 to 4.0 mm from the consideration of the stiffness and the efficiency of light utilization.

The lamination as used in this invention is not limited to insertion of air between the light guides and water vapor may be introduced between the guides for preventing degradation of the light guide unit, water or an adhesive may be inserted between the guides for preventing the guides from being peeled off, or a material having an index of refraction differing from the light guide may be inserted. Higher reflectance of the reflecting plate is preferable in this invention and the reflecting plate may be made of an aluminum deposited sheet, a silver deposited sheet and a metal foil, etc.

The thickness of the light guiding layer is thin in this invention to eliminate dark and bright stripes. While the portion of the light guide member of FIG. 4 to which the light of a CFL is directly incident, that is the lower right portion of FIG. 4, requires the shape as shown in order to have more light incident from the CFL, the rest of the guide member (upper left portion) need not be in a same thickness. As described later, because light incident in Brewster angle causes the entire p component and a part of the s component to be transmitted at the interface between the layers of the lamination of the light guide, that is the interface of layer-air-layer, and the reflected s component is reflected by the reflecting unit comprising a lamination of a phase shift plate and a reflecting plate and converted to p component, the thickness of the light guiding layer is not significant and it is more desirable that there are many interfaces.

The light guiding layer is preferably as thin as possible from the view point of reducing the weight of the light guide unit. An extra space is created by making the thickness of the light guiding layer in this portion extremely thin and the layers of substantially same size may be used in lamination without requiring the layers to be progressively in different sizes resulting in a stepped structure as shown in FIG. 2. As such, the light is not lost by re-entering from the edge of the layers and dark and bright stripes are eliminated. Even if the steps remain in the layers as shown in FIG. 2, there is a little possibility of the light re-entering and recognizable stripes are not generated because the layer is thin and the size of the edge is very small.

Figure 4A:
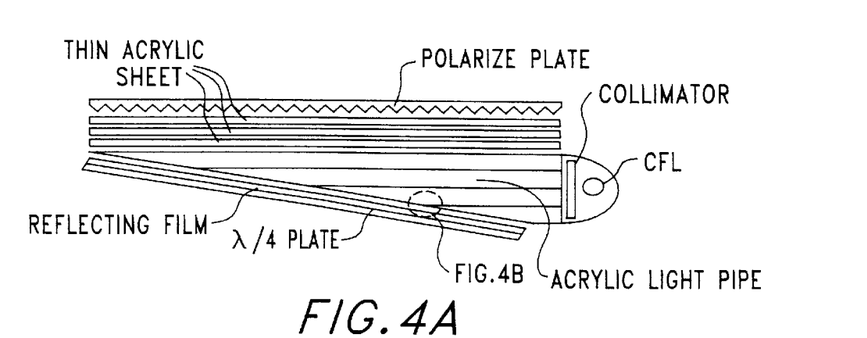
FIG. 4 is a diagram showing the structure of a LCD polarizer plate unit of this invention.
Figure 4B:
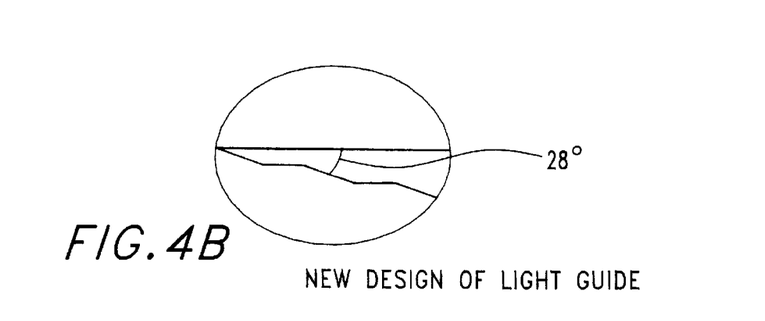

By employing the above structure, this invention allows the cross sectional shape of the light guide unit to be triangular shape as shown in FIG. 4 in contrast to the conventional unit which had a rectangular cross section as shown in FIG. 2. By this structure, the weight and the volume of the unit can be about half the conventional unit. Also, this invention can implement a mode which is similar to the mode in which a conventional back light (not generating a polarized light) uses a light guide of a wedge shaped cross section to provide an effective use of a space and allows a conventional back light to be replaced with the present polarized back light in a form compatible with the conventional type.

While the light guiding layer is acrylic material and the surrounding material is air in the example so far described, any material of the layer and any surrounding material may be used so long as the indices of refraction of the materials allow the incident light to satisfy Brewster angle or an angle which is near Brewster angle.

The light guide unit comprises a light guide member one end surface of which is the light incident surface, a plurality of light guiding layers laminated thereon, a reflecting plate disposed in the other end of said light guide member, and means disposed between said light guide member and said reflecting plate for changing the direction of polarization of the light. The light guide member is inclined with respect to the direction of the thickness and so structured that the light is incident toward the end in the side of said reflecting plate. Double back lights in which the light guide units are disposed symmetrically are also included in the concept of this invention.

The light guide unit improves the efficiency of light utilization by collimating the light incident toward the end in the side of the reflecting plate. Such light collimating means includes a collimator using a lens or a convex mirror, means having an end surface of the light guide to which light is incident shaped into a convex lens, or a combination thereof.

The light guide unit improves the efficiency of light utilization by making the angle of inclination of the light guide an angle related to Brewster angle. The light guide unit improves the efficiency of light utilization by correcting the direction of reflection by the reflecting plate. To do this, the reflecting plate may be inclined, a Fresnel rhomb may be used for changing the angle of emission or a prism sheet may be used. Inclination of the reflecting plate may be in stepwise for saving a space.

Further, materials of differing indices of refraction may be laminated along the side of the reflecting plate of the light guide member to reduce the reflectance upon re-entrance into the light guide for changing the direction of propagation of the light stepwise. With such structure, diffusion of the light in the reflecting end of the light guide may be controlled.

The light guide unit improves the utility by correcting the direction of emitting the light in the exit surface. To do such, a prism sheet may be used or grooves may be formed on the reflecting surface side of the light guide. The utility is further improved by making the prism sheet in a shape satisfying an angle related to Brewster angle.

The light guide unit comprises a light guide member which comprises a plurality of laminated light guides one end surface of which is the light incident surface while the other end of which is inclined with respect to the direction of the thickness and cut into a plane. The plurality of light guides are formed with an inclination of an angle which is related to Brewster angle with respect to the direction of the thickness of the light guide member.

The light guide unit comprises a single light guide or a plurality of laminated light guides sheets one end surface of which is the light incident surface while the other end of which is inclined with respect to the direction of the thickness and cut into a plane. A plurality of grooves are formed in the direction perpendicular to the direction of thickness of the light guide unit as shown in the partially enlarged view of the other end surface in FIG. 4. The light guide sheets are laminated in an angle of inclination related to Brewster angle with respect to the direction of thickness of the light guide member.

The groove comprises a combination of a slope of an angle smaller than the angle of inclination of the other end surface and a slope of a larger angle of inclination (28.0-degrees as shown in the partial enlargement in FIG. 4). The expression "related to Brewster angle" means that the design is such that the incident light totally reflected by the groove coincides Brewster angle.

Figure 5:
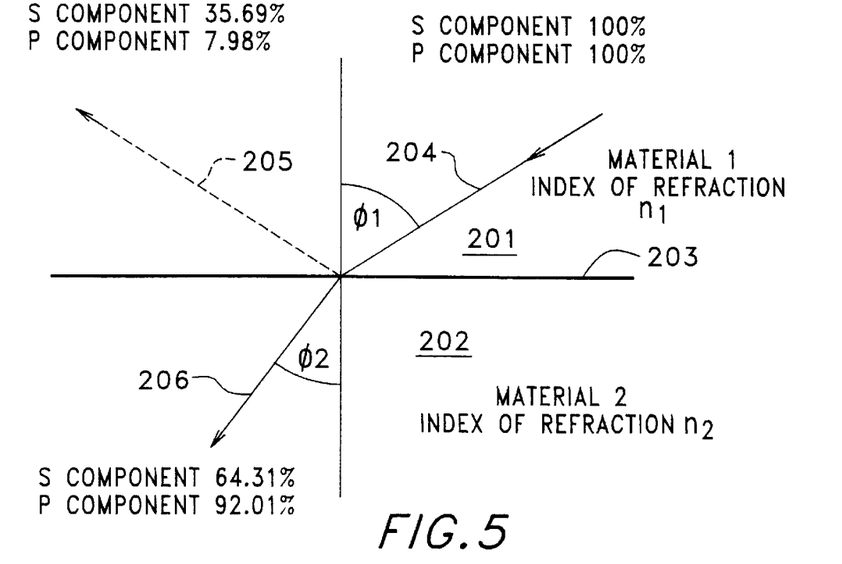
FIG. 5 is a diagram showing refraction of light between different materials.

The relationship between the index of refraction of a medium and the angle of the groove is given by using a general expression with reference to FIG. 5. In the expression, n1 is an index of refraction of the light guide, n0 is an index of refraction of a material other than the light guide (air in FIG. 5), and f0 is the angle of the groove (the slope of the larger angle of inclination). The relationship between Brewster angle FAEb and n1, n0 is given by;

$$fAEb = \sin^{-1}[n1^2/(n1^2+n2^2)]^{1/2} (\text{rad})$$

The angle of incidence to the upper surface of the light guide is given by a geometric analysis using f0:

$$fI/2 - 2f0 (\text{rad})$$

Snell's law is expressed on the upper surface of the light guide as;

$$\sin fAEb/\sin(fI/2-2fO)=n1/n2$$

solving this expression for fO gives the following general solution;

$$fO=\cos-1\{(n2/n1)[n12/(n12+n22)]^{1/2}/2(\text{rad})$$

Any medium satisfies the condition of this invention as long as it satisfies the above general expression.

The method of polarizing the light comprises a step of directing a light having a first and a second polarized components to an interface between two materials having differing indices of refraction to have a part of the light be reflected and have another part be transmitted, a step of changing the direction of polarization of the reflected or transmitted light, and a step of changing the direction of propagation of the reflected or transmitted light to a direction in which both the reflected and transmitted lights can be utilized simultaneously. The method of polarizing the light also comprises a step of having a light having first and second polarized components incident to a plane which is adjacent to the other end surface of a plurality of inclined and laminated light guides, a step of having the light including the first and the second polarized components reflected in the plane adjacent to the other end surface, a step of having a light containing the first polarized component in a first direction of exit more than the second polarized component transmitted through an exit surface of each of the plurality of light guides and having a portion of a light containing the second polarized component more than the first polarized component reflected at the exit surface of each of the plurality of the light guides, a step of having lights containing the partly reflected second polarized component more than the first polarized component emitted out of the light guide member, a step of changing the direction of polarization of the lights emitted out of the light guide member containing the second polarized component more than the first polarized component, a step of reflecting the lights which are changed in the polarization direction, a step of changing again the direction of polarization of the light which is changed in the polarization direction and reflected to change it to a light containing the first polarized component in the second direction of emission more than the second polarized component, a step of having the light containing the first polarized component in the second direction of emission more than the second polarized component enter the light guide member, and a step of having light containing the first polarized component in the second direction of emission more than the second polarized component transmitted through the exit surface of each of the plurality of light guides.

The liquid crystal display device comprises a liquid crystal display cell and a back light unit behind the cell. The back light unit comprises a light source, a glass substrates between which liquid crystal is sandwiched, an upper polarizing plate, means for changing the direction of polarization of either a light reflected by or a light transmitting through the interface between two materials having differing indices of refraction from a light containing a first and a second polarized components, and means for changing the direction of propagation of either the light the direction of polarization of which is changed or the light other than the light the direction of polarization of which is changed into a direction which allows these two lights to be utilized simultaneously.

The liquid crystal display device comprises a light source, a glass substrates between which liquid crystal is sandwiched, an upper polarizer plate, and a plurality of laminated light guides inclined with respect to the direction of thickness of the light guide member. The liquid crystal display device further comprises a light guide member one end surface of which is the light incident surface, a prism disposed on the exit surface of the light guide member, a reflecting plate disposed in the other end of said light guide member, and means disposed between said light guide member and said reflecting plate for changing the direction of polarization of the light.

The principle of operation of this invention is now described. In order to facilitate an understanding of the principle of operation before it is described, a change of polarized component of a light in transmitting through, refracting and reflecting at an interface between materials having differing indices of refraction is described with reference to FIGS. 5, 6 and 7.

In FIG. 5, when a light 204 is directed to an interface 203 between two materials 201 and 202 having different indices of refraction n1, n2 in an incident angle fO1 which is less than a critical angle, a part of the light 205 is reflected while another part of the light 206 is transmitted through the interface. Assuming a plane which the incident light ray makes at the point of incidence be an incident plane, the polarized components of the incident light 204 is separated into p component which is in parallel with the incident plane and s component which is perpendicular to the incident plane.

Modifying Maxwell equation for a dielectric material, the transmittance of the polarized components p and s are given by;

$$Tp=\sin(2fO1)\times\sin(2fO2)/(\sin2(fO1+fO2)\times\cos 2(fO1-fO2))$$

$$Ts=\sin(2fO1)\times\sin(2fO2)/\sin2(fO1+fO2)$$

$$n1\times\sin (fO1)=n2\times\sin (fO2)$$

where Tp: transmittance of p component (1−reflectance Rp)
Ts: transmittance of s component (1−reflectance Rs)
fO1: incident angle of light
fO2: exit angle of light
n1: index of refraction of material 201
n2: index of refraction of material 202 or it is known that;

$$Rp=(((n1/\cos(fO1))-(n2/\cos(fO2)))/((n1/\cos(fO1))+(n2/\cos(fO2))))2$$

$$Rs=(((n1\times\cos(fO1))-(n2\times\cos(fO2)))/((n1\times\cos(fO1))+(n2\times\cos(fO2))))2$$

Figure 6:
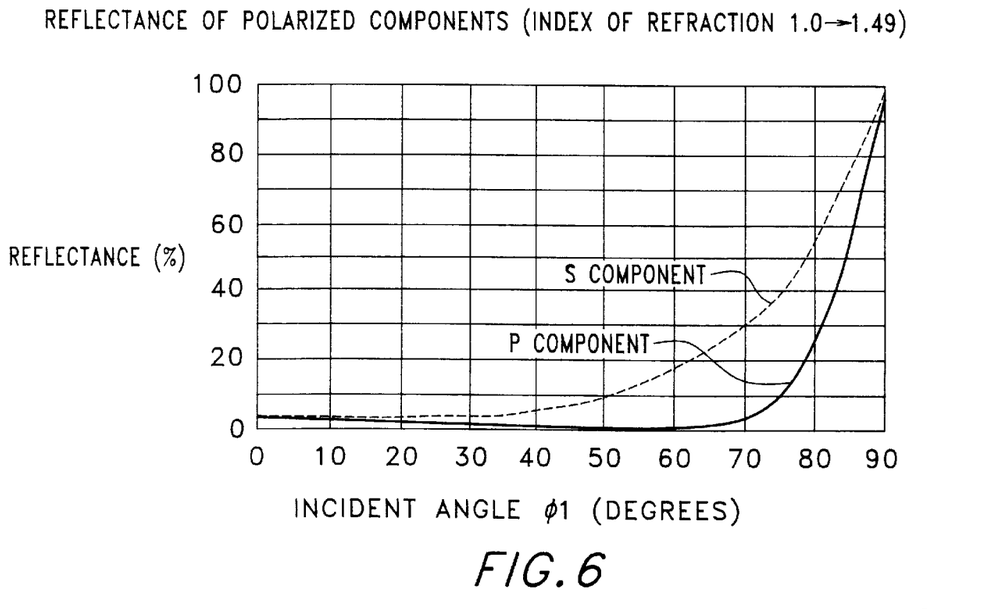
FIG. 6 shows a characteristic plots of reflectance when the light is incident from a material having an index of refraction of 1.0 to a material having an index of refraction of 1.49.
Figure 7:
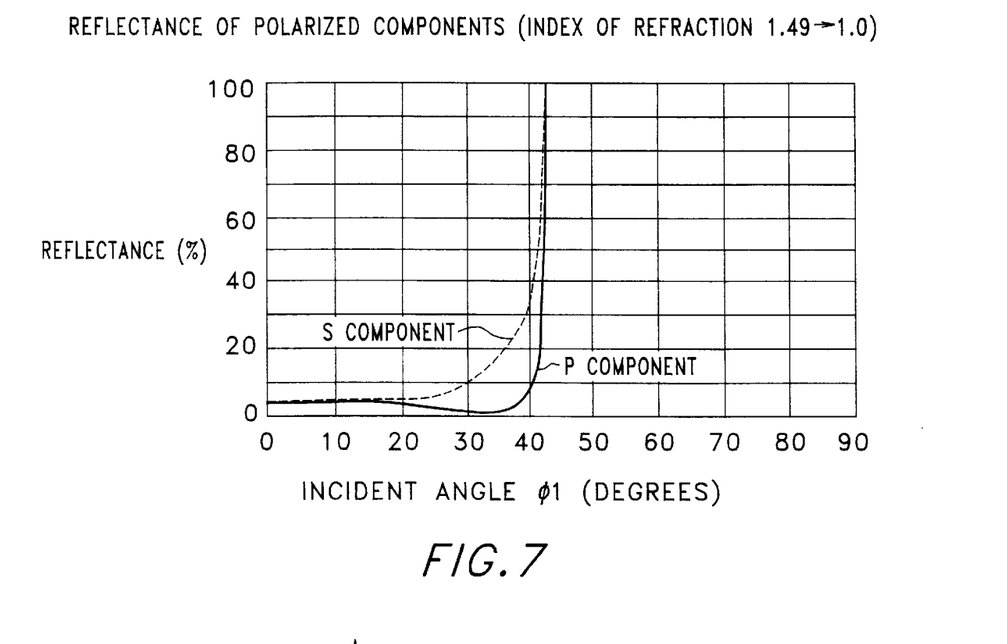
FIG. 7 shows a characteristic plots of reflectance when the light is incident from a material having an index of refraction of 1.49 to a material having an index of refraction of 1.0.

The reflectance of p polarized component and s polarized component vary depending of the incident angle fO1 and the exit angle fO2, as shown in FIG. 6 and FIG. 7, and differ each other even in a same incident angle fO1 (reflectance/transmittance characteristics are different between s and p polarized components). For example, when the light proceeds from an acrylic material having an index of refraction of 1.49 to air which has an index of refraction of 1.00 (FIG. 7), the critical angle in which a total reflection takes place is 42.1-degrees. If the light is incident at 40-degrees which is less than the critical angle, the exit angle fO2 will be 77.8-degrees according to Snell's law. Substituting the above equation of Rs and Rp with this, the reflectance for the s component is 35.69-percent while the reflectance for the p component is 7.98-percent.

The light not reflected transmits through the light guide 202. The transmitted light is (100−35.69=64.31-percent) of the incident light for the s component while it is (100−7.98=

92.02-percent) of the incident light for the p component. Therefore, when an incident light 204 containing 100-percent of s component and 100-percent of p component proceeds from an acrylic material having an index of refraction 1.49 to air having an index of refraction 1.00 at an angle of 40-degrees, the reflected light 205 will contain 35.69-percent of s component and 7.98-percent of p component while the transmitted light 206 will contain 64.31-percent of s component and 92.02-percent of p component if there is no loss of light energy such as scattering at the interface or an internal absorption of the light in the materials 1 and 2.

Figure 8:
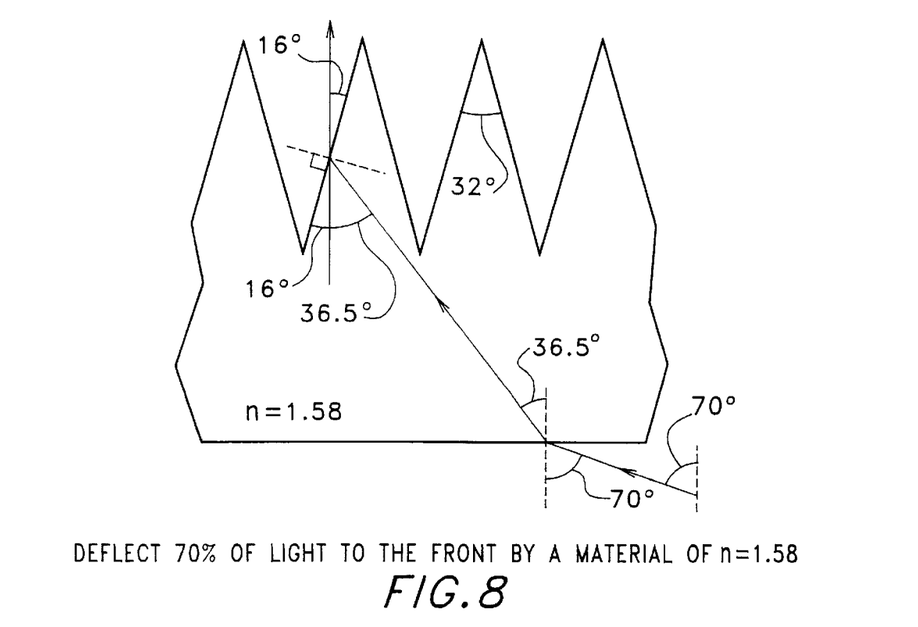
FIG. 8 is a diagram showing deflection of the light by a prism sheet.

The light emitted from the light guide is largely inclined in 70-degrees from the front thereof in this invention. Two methods are available for deflecting the light to right angle to the front surface. The first method is to have the light refract twice to deflect it to the front, in which a prism sheet is used with the apex thereof oriented upward as shown in FIG. 8. When the index of refraction n of the material of the prism is 1.58, a prism sheet having an angle of apex of 32-degrees is required to deflect the light to the front.

Figure 9:
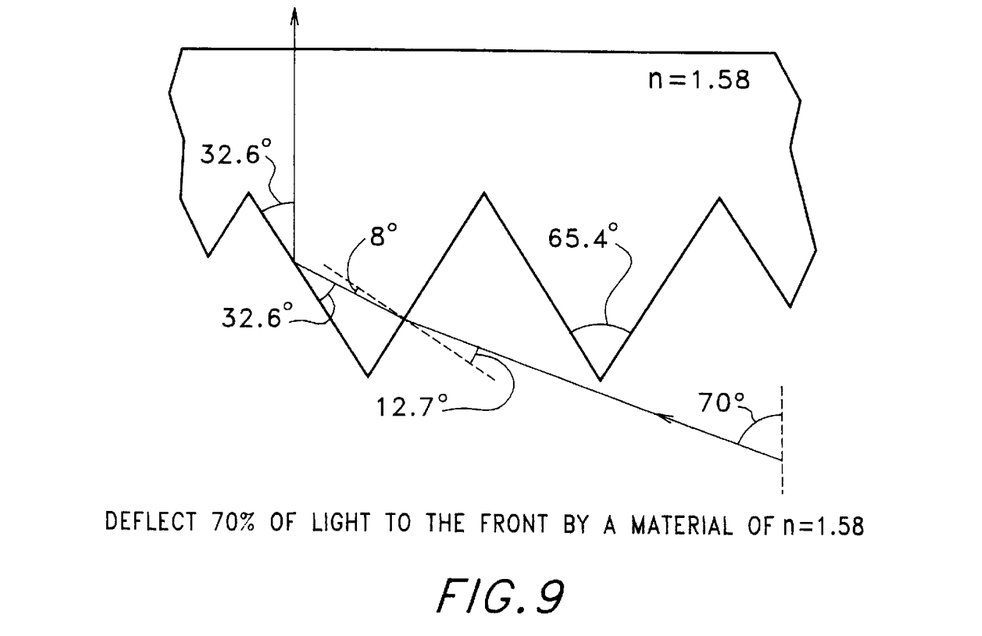
FIG. 9 is a diagram showing deflection of the light by a prism sheet.

The second method is to have the light refract once and totally reflect once to deflect to the front, in which the prism sheet is used with the apex thereof oriented downward as shown in FIG. 9. In this case, a prism having an angle of apex of 65.4-degrees is required. As seen in the above, the same effect results whether the prism is oriented upward or downward. From the viewpoint of fabrication, it is more advantageous in the viewpoint of yield and cost to use the prism with the apex oriented downward because a smaller apex angle of a prism is more difficult to fabricate (a larger apex angle can be used when the apex is oriented downward).

It is desirable that these optical components (light guide, light guiding layer and prism) do not have an internal birefringence. Therefore, these components are preferably formed of a transparent material which is free from a birefringence. The axis of polarization of the light emitted from the back light is in the vertical and horizontal directions of the screen. However, this does not match a liquid crystal panel of a TN mode which is currently in the market because the axis of such liquid crystal panel is in +/–45-degrees in the screen.

To solve this mismatch, it is effective to insert a phase difference film between the panel and the back light. The axis of polarization of the back light can be matched the TN liquid crystal panel by rotating the axis of polarization by 45-degrees by a combination with the phase difference film. The same effect as the combination with the phase difference film can be obtained by inserting another TN liquid crystal cell between the back light and the TN liquid crystal panel with the axis of polarization of the TN cell being rotated by 45-degrees.

Figure 10:
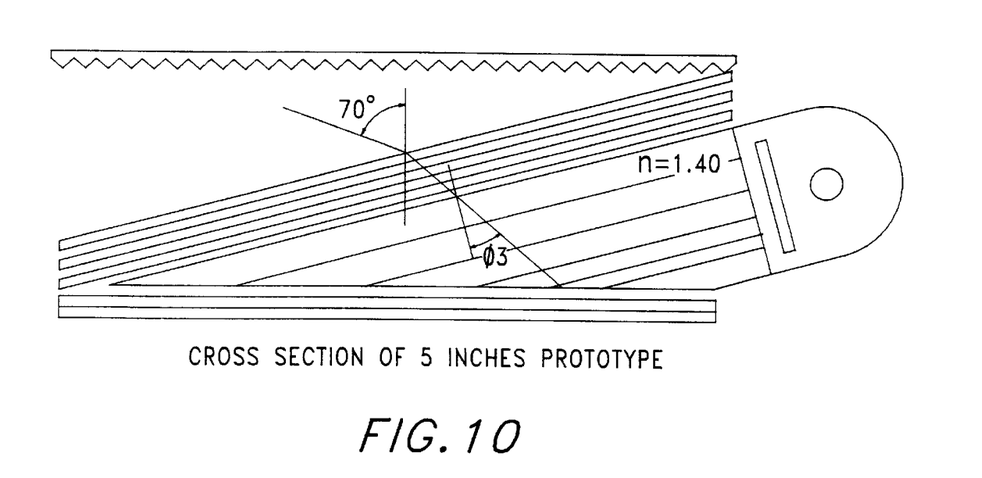
FIG. 10 is a diagram showing the structure of an LCD polarization unit.

An embodiment of this invention is further described hereunder with reference to FIG. 4. A sample of 5-inches in diagonal length was developed, designed and fabricated with measurement of the performance. A cross-sectional view of a prototype is shown in FIG. 10. As shown in the enlarged view in FIG. 4, the bottom surface of the light guide is cut into grooves of 500 microns pitches having 28.0-degrees apex. The light guide consists of a lamination of 5 sheets of elementary unit, each being 2 mm thickness, and has a total thickness of 10 mm. 5 thin acrylic plates, each being 0.2 mm thickness, are laminated on the light guide. By calculation, $(0.85)10=0.20$ and it is expected that 80-percent of the s component is reflected and a merit of 80-percent is expected as a theoretical limit. It is expected that the ratio of the intensity of the emitted light is about 5.

Specifications of the sample presently fabricated and a sample of a conventional design fabricated for the purpose of comparison are shown in Table 1.

TABLE 1

|  | Prototype | Conventional Type |
| --- | --- | --- |
| Active Area [mm2] | 110 × 100 | 110 × 100 |
| Thickness [mm] | 10 | 10 |
| Light Source | CFL | CFL |
| Lamp Reflector | Silver on PET | Silver on PET |
| Material of Light Pipe | Acryl | Acryl |
| Dot Pattern | None | Yes |
| Bottom Reflector | Silver on PET | White PET |
| fE/4 Film | Yes | None |
| Diffusion Sheet | None | Yes |
| Thin Acrylic Sheet | Yes (5 layers) | None |
| Polarizer Plate | Yes | None |
| Collimator Sheet | None | Yes (BEFII × 1) |

Figure 11:
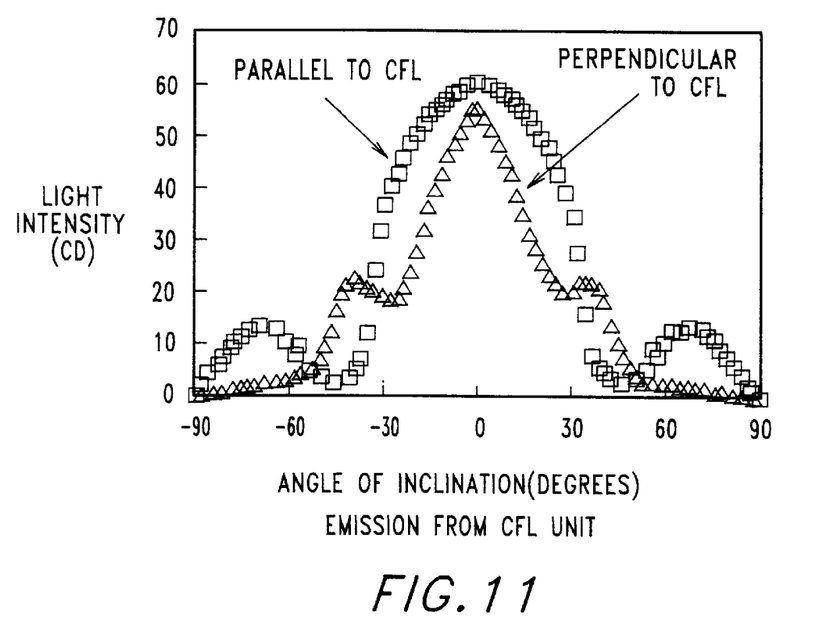
FIG. 11 shows an emission characteristic of a lamp.

An emittance characteristic of light from the light source is first shown. fO2CFL is used for a light source and approximated to a point source as far as possible. The reflector is of a parabolic shape so as to make the light reflected by the light source parallel and incident to the light guide. A light collecting sheet is disposed at the incident end of the light guide to collect the light in the direction of the axis of the lamp. FIG. 11 shows the emission characteristic. The abscissas give angle of inclination while the ordinates give the light intensity. It is seen that the light is concentrated both vertically and horizontally with respect to the axis of the lamp. The half width value is 19-degrees or greater vertically and 32-degrees or greater horizontally.

Figure 12:
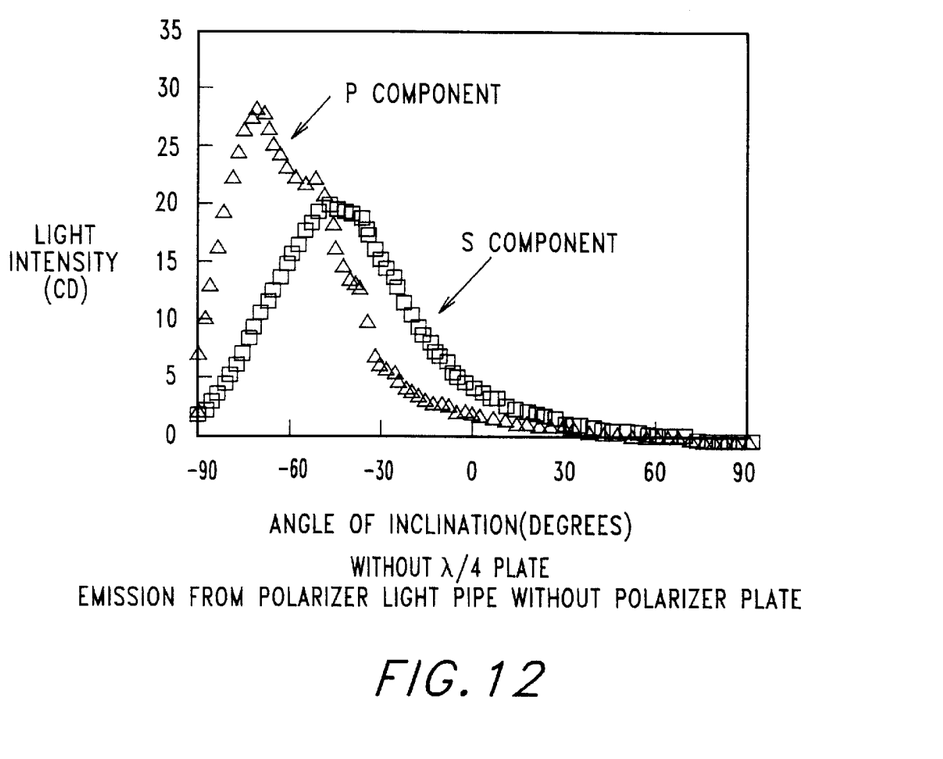
FIG. 12 is a graph showing an emission characteristic of the light from the light guide unit.
Figure 13:
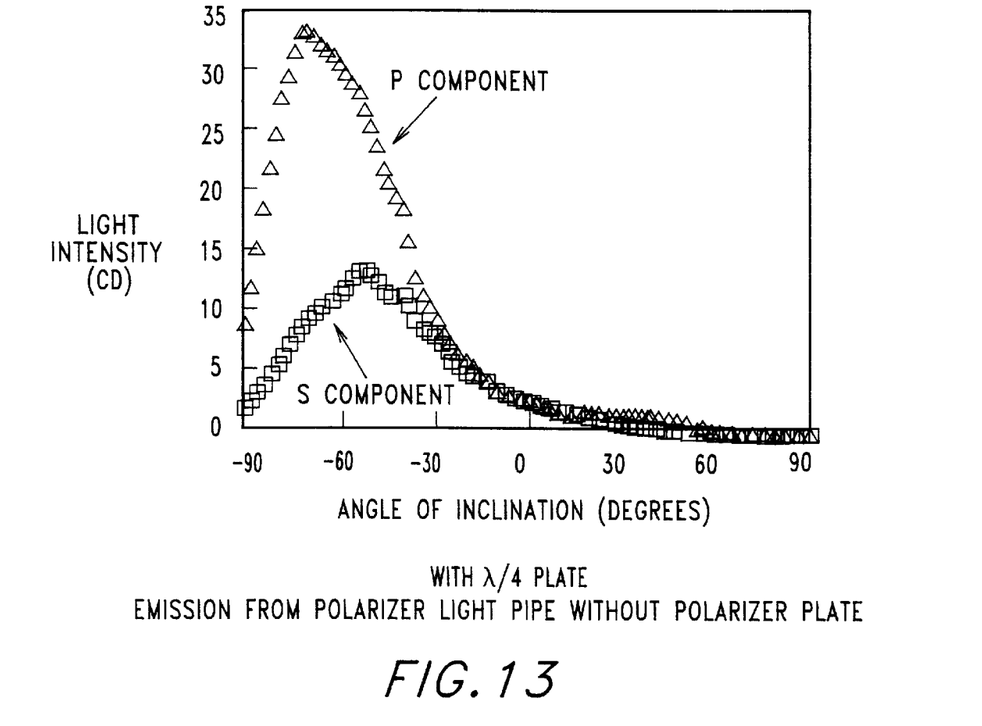
FIG. 13 is a graph showing an emission characteristic of the light from the light guide unit.

FIG. 12 and FIG. 13 show the emission characteristic of the light guide unit. A quarter wavelength plate is not attached in FIG. 12 while it is attached in FIG. 13. It is seen that the s component reflected by the quarter wavelength plate is converted to a p component. By calculation, the p component has increased 28-percent while the s component has decreased 33-percent. The ratio of the intensity at 70-degrees is 3.5 which is fairly well approximated to the value of 5 obtained by a calculation beforehand.

Figure 14:
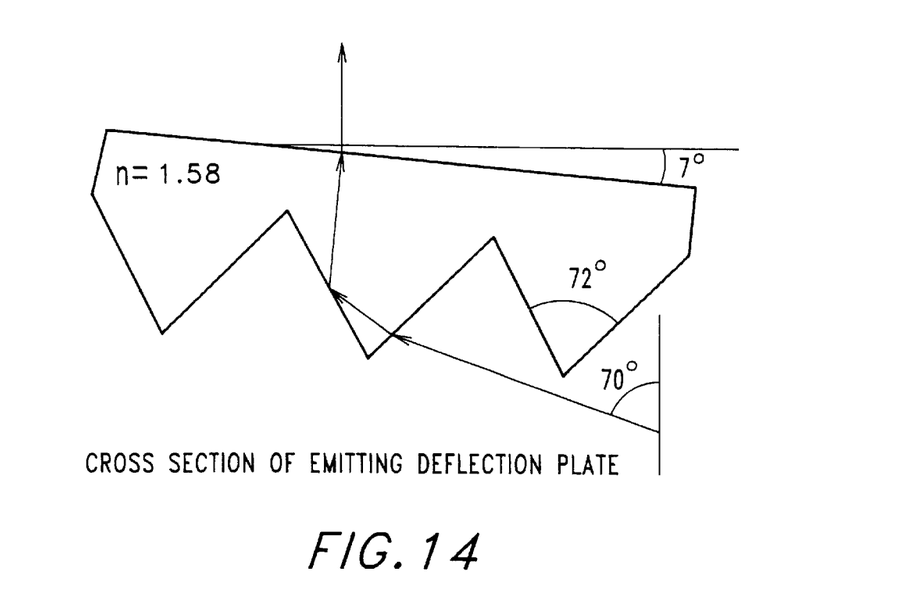
FIG. 14 shows a cross-sectional view of a polarizer plate.

A deflector plate is disposed on the top of the light guide. A cross-sectional view of the presently made deflector is shown in FIG. 14. This deflector plate is so adjusted that the final emission angle is 0-degrees by utilizing a total reflection at the slope.

Figure 15:
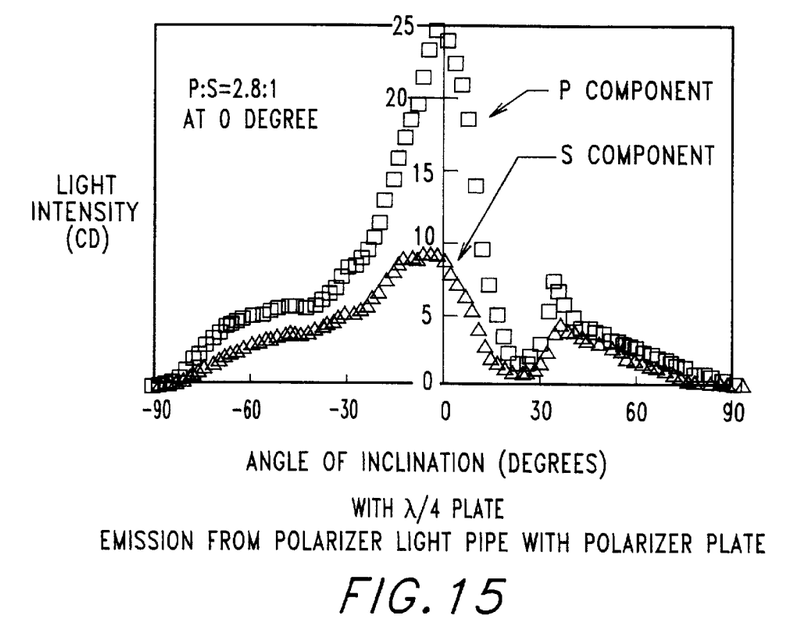
FIG. 15 is a graph showing an emission characteristic of the light after passing the polarizer plate.

FIG. 15 shows a characteristic after passing the deflector plate. The light inclined in 70-degrees is changed to the front direction. The half width value at the front is +12/–18-degrees. The polarization is kept in a good value of 2.8 because the deflector plate was made from a polycarbonate so as to avoid birefringence.

Figure 16:
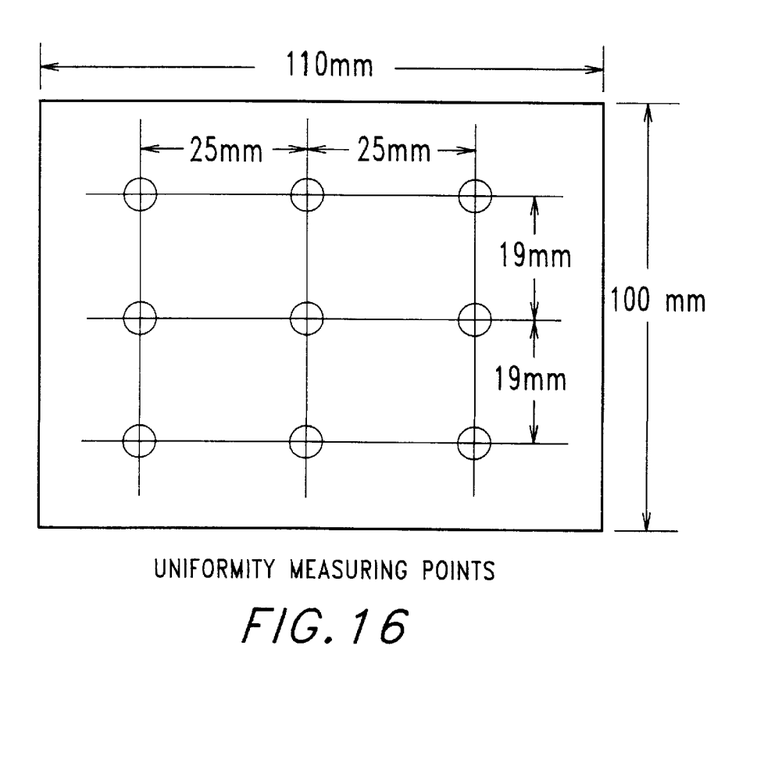
FIG. 16 is a diagram showing points of measuring the uniformity in the plane.

The uniformity in the plane was next measured. Nine points shown in FIG. 16 were measured in the front direction without swinging angles. Minimum brightness/Maximum brightness=85-percent and it is found that this is not different from a conventional device.

Finally, the performance was compared to a back light of a conventional design. The result of the comparison is given in Table 2.

TABLE 2

Comparison of Performance

|  | Prototype | Conventional Type (one sheet of BEF) |
|---|---|---|
| Lamp Current [m] | 5 | 5 |
| Intensity of p Component [cd/m2] | 2136 | 1690 |
| Improvement [%] | 26.4 |  |
| Uniformity | 84.5 | 86.9 |

It is found that the p component has been improved 26-percent in comparison to a back light using one sheet of BEF. It can be said that the 26-percent improvement is the merit over the conventional type of back light.

Effect of the Invention: According to this invention, emitted light is prevented from being re-absorbed so as to avoid generation of dark and bright stripes in a liquid crystal display device in which light efficiency is improved by utilizing a polarized component not so far utilized.

According to this invention, the light guide unit can be made into a wedge shape so as to maintain a compatibility with a conventional liquid crystal display device.

Further, this invention allows the weight of the entire unit to be reduced and the entire unit to be compact by making the thickness of the light guide as thin as possible. Also, this invention can prevent the emitted light from being in dark and bright stripes. Still further, this invention allows the emitted light to be corrected without making the apex of the prism as sharp as it was formerly.

DESCRIPTION OF REFERENCE NUMBERS

100: Conventional LCD device
101: Light source
102: Light guide plate
103: Diffusion sheet
104: Lower polarizer plate
105: Glass substrate
106: Color filter
107: Upper polarizer plate
108: Back light
201: Material 1
202: Material 2
203: Interface between the materials
204: Incident light
205: Reflected light
206: Transmitted light While the invention has been particularly shown and described with reference to a preferred embodiment thereof, it will be understood by those skilled in the art that various other changes in the form and details may be made without departing from the spirit and scope of the invention.

What is claimed is:

1. A light guide unit comprising:
   a light guide member having an incident surface in one end surface and having the other end surface inclined with respect to the direction of thickness;
   a reflecting plate disposed adjacent to said other end surface;
   means disposed between said member and said reflecting plate for changing the direction of polarization of the light; and
   a plurality of light guiding layers laminated on the surface of a larger area of said light guide member.

2. A light guide unit of claim 1 in which said light guide member comprises a plurality of laminated light guiding sheets, and each of said plurality of light guiding layers are thinner than each of said plurality of laminated light guiding sheets.

3. A light guide unit of claim 1 in which said light guide member comprises a single light guiding sheet, and each of said plurality of light guiding layers is thinner than said single light guiding sheet.

4. A light guide unit of claim 1 in which each of said plurality of light guiding layers is of a substantially same shape.

5. A light guide unit of claim 1 in which the area of the larger area surface of said light guide member is substantially same as the area of each of said plurality of light guiding layers.

6. A light guide unit of claim 1 in which a phase difference film for changing the direction of polarization of light is disposed on said plurality of light guiding layers.

7. A light guide unit of claim 6 in which said phase difference film is a polarimetric film.

8. A light guide unit of claim 6 in which said phase difference film is a TN liquid crystal cell.

9. A light guide unit comprising:
   a light guide member having an incident surface in one end surface and having the other end surface inclined with respect to the direction of thickness of said light guide member;
   a reflecting plate disposed adjacent to said other end surface of said light guide member;
   means disposed between said other end surface of said light guide member and said reflecting plate for changing the direction of polarization of the light;
   a prism sheet having apexes only in one side and disposed adjacent to the side of a larger area surface of said light guide member; and
   a side of said prism sheet having said apexes formed therein confronting said side of a larger area surface of said light guide member.

10. A light guide unit of claim 9 in which a phase difference film for changing the direction of polarization of light is disposed on said prism sheet.

11. A light guide unit of claim 10 in which said phase difference film is a polarimetric film.

12. A light guide unit of claim 10 in which said phase difference film is a TN liquid crystal cell.

13. A liquid crystal display device comprising a liquid crystal cell and a light guide unit disposed in the back of said liquid crystal cell, said light guide unit comprising:
   a light guide member having an incident surface in one end surface and having the other end surface inclined with respect to the direction of thickness of said light guide member;
   reflecting plate disposed adjacent to said other end surface;
   means disposed between said other end surface of said light guide member and said reflecting plate for changing the direction of polarization of the light; and
   a prism sheet having apexes only in one side and disposed in the side of a larger area surface of said light guide member, the one side of said prism sheet having said apexes therein confronting said side of a larger area surface of said light guide member.

14. A liquid crystal display device of claim 13 in which a phase difference film for changing the direction of polarization of light is disposed on said prism sheet.

15. A liquid crystal display device of claim 14 in which said phase difference film is a polarimetric film.

16. A liquid crystal display device of claim 14 in which said phase difference film is a TN liquid crystal cell.

17. A light guide unit comprising:

a light guide member having an incident surface in one end surface and having the other end surface inclined with respect to the direction of thickness;

a reflecting plate disposed at said other end surface;

means disposed between said member and said reflecting plate for changing the direction of polarization of the light; and said other end surface having a plurality of grooves disposed in the direction perpendicular to the direction of the thickness of said light guide member;

said grooves comprising a combination of a slope of an angle of inclination less than the angle of inclination of the other end surface and another slope of a larger angle of inclination, and said larger angle of inclination having an angle of inclination related to the Brewster angle.

18. A light guide unit of claim 17 in which said groove comprises a combination of a slope of an angle of inclination less than the angle of inclination of the other end surface and another slope of a larger angle of inclination, and said larger angle of inclination fO is given by:

$$fO = \cos{-1}\{(n2/n1)[n12/(n12+n22)]^{1/2}\}/2$$

where n1 is an index of refraction of the light guide and n2 is an index of refraction of a material other than the light guide.

19. A light guide unit comprising:

a light guide member having an incident surface in one end surface and having the other end surface inclined with respect to the direction of thickness of said light guide member;

a plurality of grooves disposed in said other end surface, said plurality of grooves extending in a direction that is perpendicular to the direction of the thickness of the said light guide member;

a reflecting plate disposed adjacent to said plurality of grooves; and means disposed between said plurality of grooves and said reflecting plate for changing the direction of polarization of the light.

20. A liquid crystal display device comprising a liquid crystal cell and a light guide unit disposed in the back of said liquid crystal cell, said light guide unit comprising:

a light guide member having an incident surface in one end surface and having the other end surface inclined with respect to the direction of thickness;

a reflecting plate disposed adjacent to said other end surface; means disposed between said member and said reflecting plate for changing the direction of polarization of the light; and a plurality of light guiding layers further laminated on the surface of the larger area of said light guide member.

21. A light guide unit comprising:

a light guide member having an incident surface in one end surface and having the other end surface inclined with respect to the direction of thickness;

a reflecting plate disposed at said other end surface;

means disposed between said member and said reflecting plate for changing the direction of polarization of the light;

said other end surface having a plurality of grooves disposed in the direction perpendicular to the direction of the thickness of said light guide member; and a plurality of light-guiding layers laminated on said surface of a larger area of said light guide member.

22. A light guide unit comprising:

a light guide member having an incident surface in one end surface and having the other end surface inclined with respect to the direction of thickness;

a reflecting plate disposed at said other end surface;

means disposed between said member and said reflecting plate for changing the direction of polarization of the light;

a prism sheet having apexes only in one side and disposed in the side of a larger area surface of said light guide member;

the side of said prism sheet having said apexes formed therein being confronted said light guide member; and the shape of said apexes formed in said prism sheet being symmetrical and the angle of said apexes satisfying the following expression:

$$\sin{-1}-[(n0/n1)\sin(A+fi-fL\_/2)]-3fi+fL\_/2=0$$

where fi is said angle of said apexes/2 (rad), n0 is an index of refraction of a material surrounding said prism sheet, n1 is an index of refraction of said prism sheet, and A is an angle (rad) which the light incident to said prism sheet makes relative to a normal line from the surface opposite to the surface having the apexes of said prism sheet.

23. A light guide unit comprising:

a light guide member having an incident surface in one end surface and having the other end surface inclined with respect to the direction of thickness;

a reflecting plate disposed at said other end surface;

means disposed between said member and said reflecting plate for changing the direction of polarization of the light;

a prism sheet having apexes only in one side and disposed in the side of a larger area surface of said light guide member;

the side of said prism sheet having said apexes formed therein being confronted said light guide member; and a plurality of light-guiding layers laminated between said side of said larger area surface of said light guide member and said prism sheet.

24. A liquid crystal display device comprising a liquid crystal cell and a light guide unit disposed in the back of said liquid crystal cell, said light guide unit comprising:

a light guide member having an incident surface in one end surface and having the other end surface inclined with respect to the direction of thickness;

a reflecting plate disposed at said other end surface;

means disposed between said member and said reflecting plate for changing the direction of polarization of the light;

a prism sheet having apexes only in one side and disposed in said side of a larger area surface of said light guide member, said one side of said prism sheet having said apexes therein confronting said light guide member; and a plurality of light-guiding layers laminated between said side of a larger area surface of said light guide member and said prism sheet.

* * * * *